June 19, 1962
J. K. BRUCE
3,039,625
PROCESS AND APPARATUS FOR HANDLING OBJECTS
Filed April 28, 1958
12 Sheets-Sheet 6
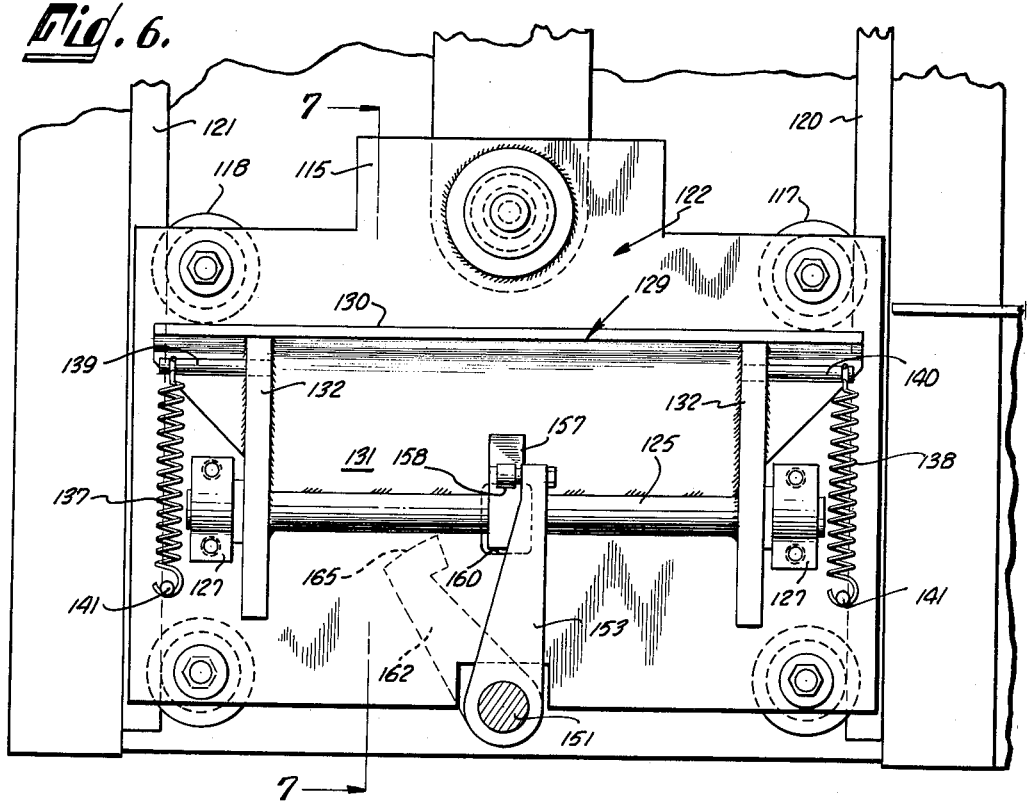
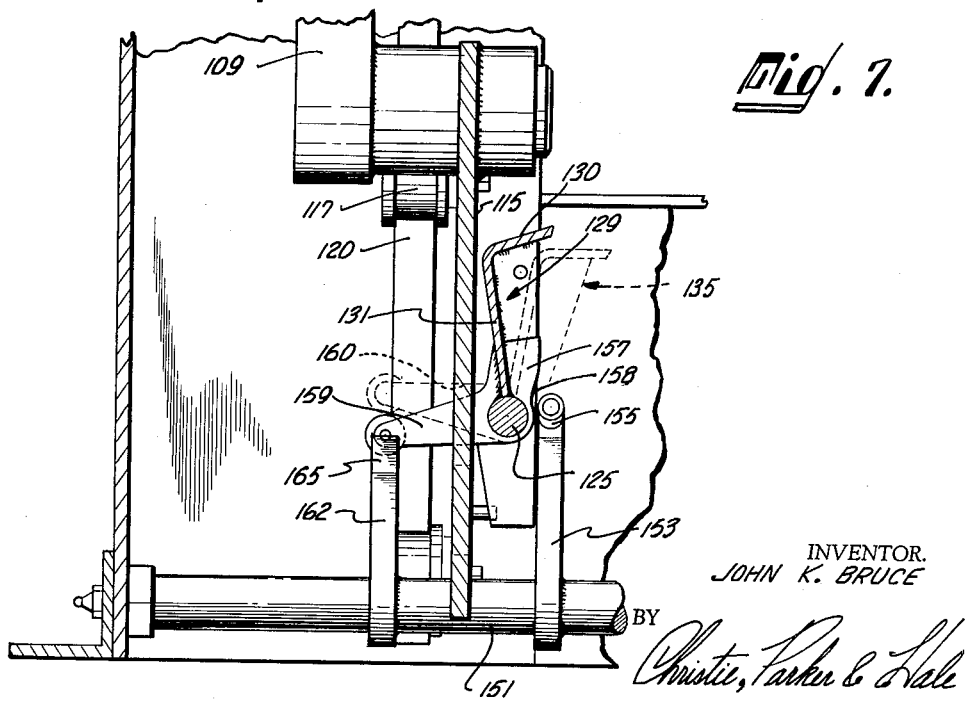
INVENTOR.
JOHN K. BRUCE
BY
ATTORNEYS.

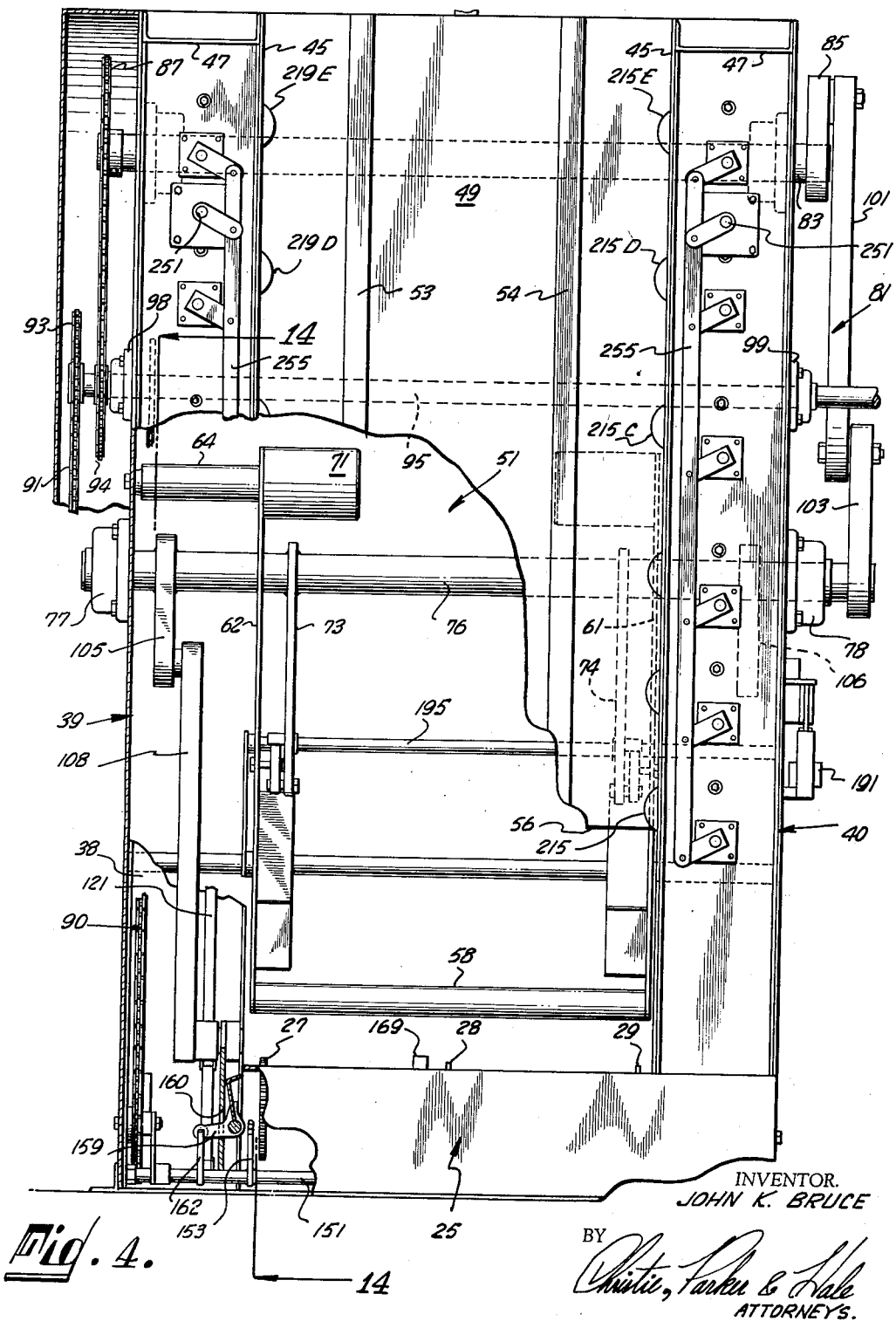

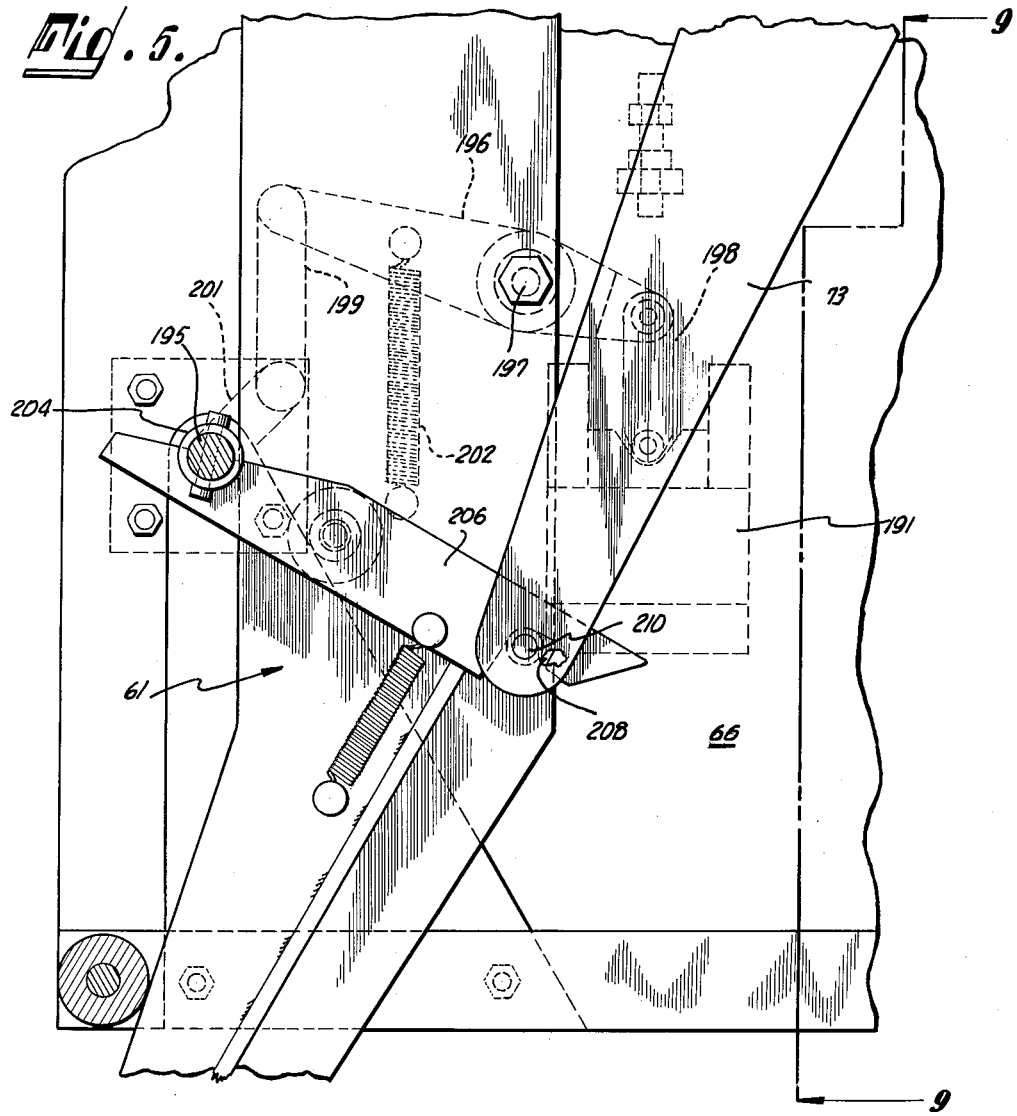

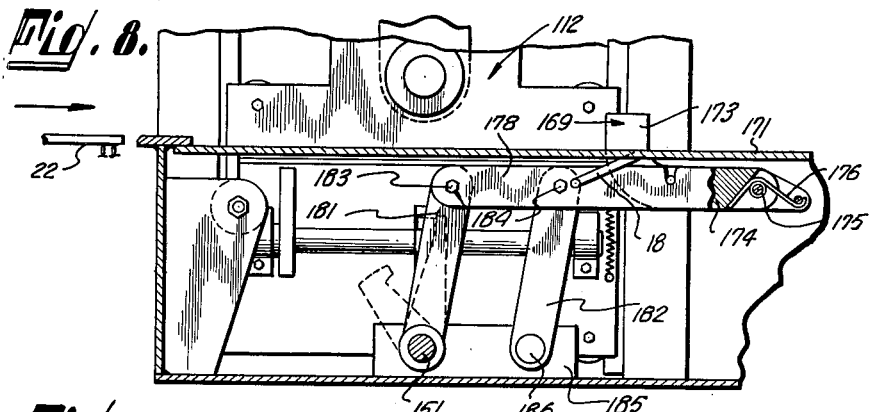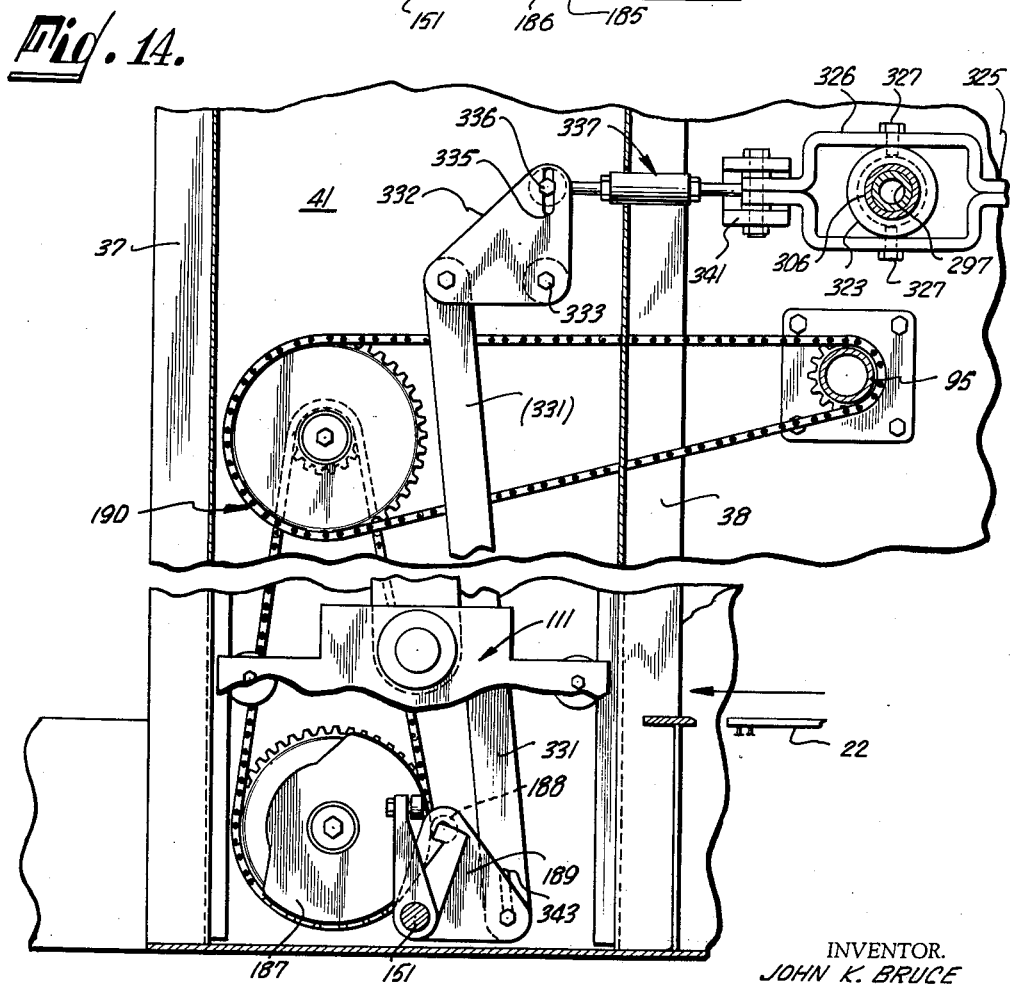

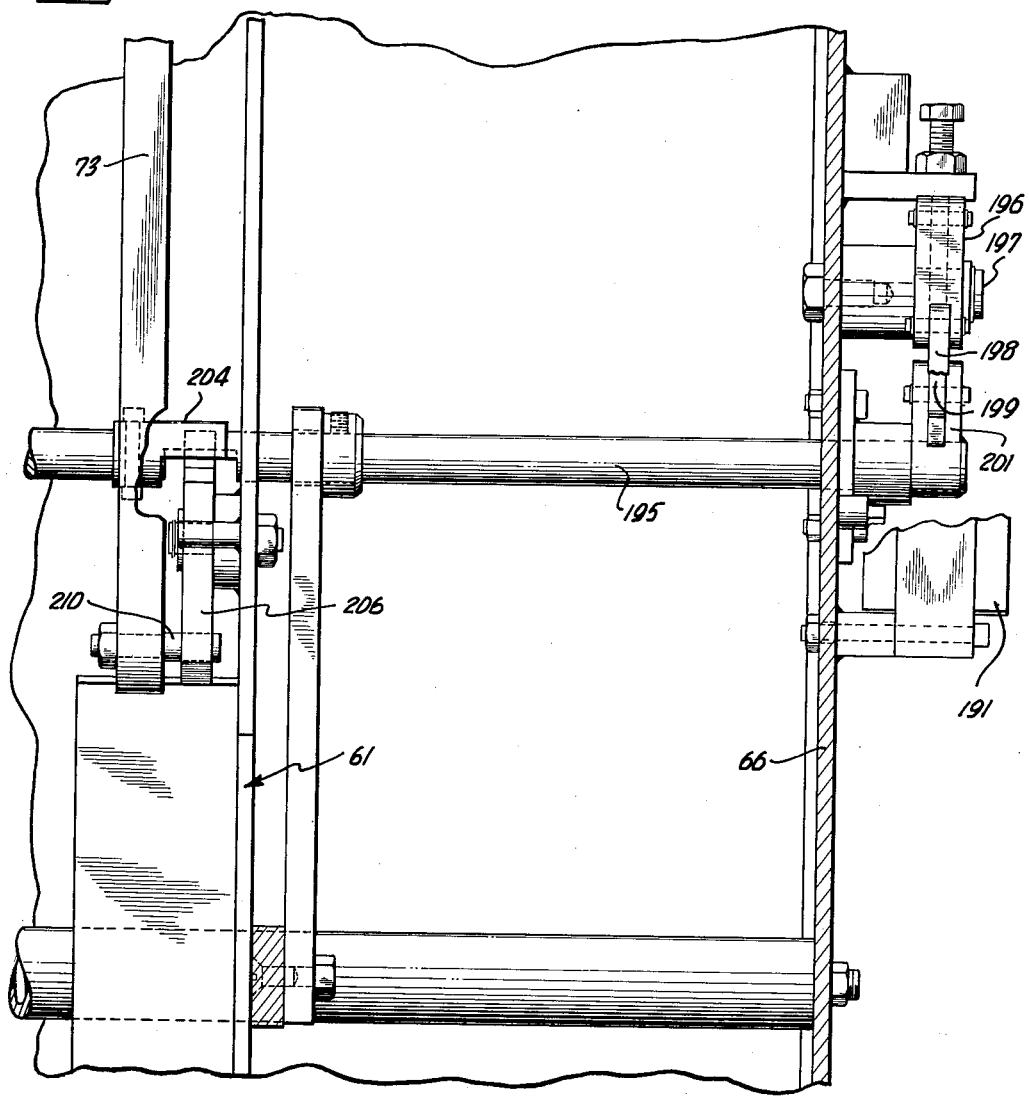

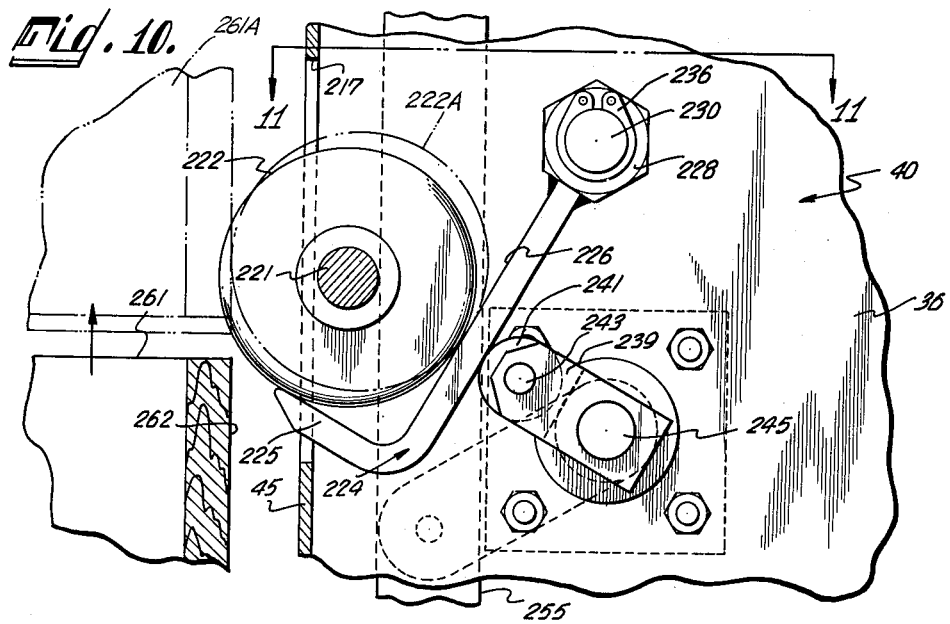
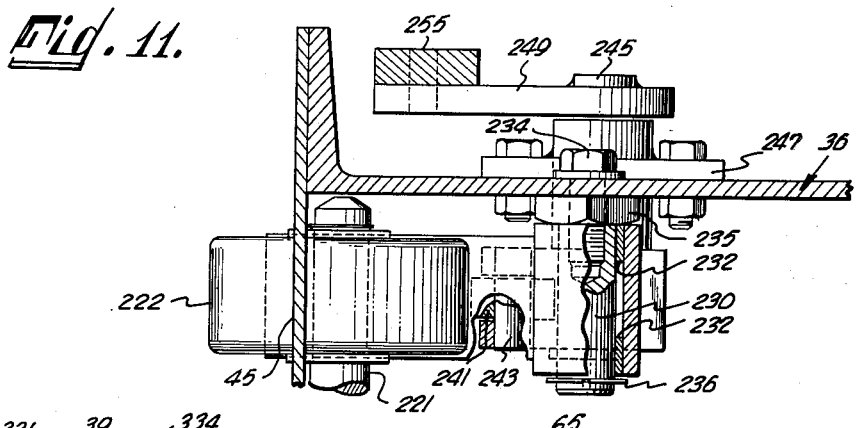
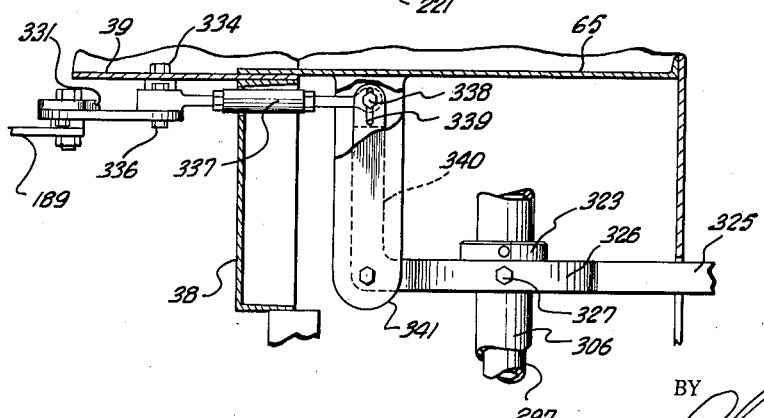

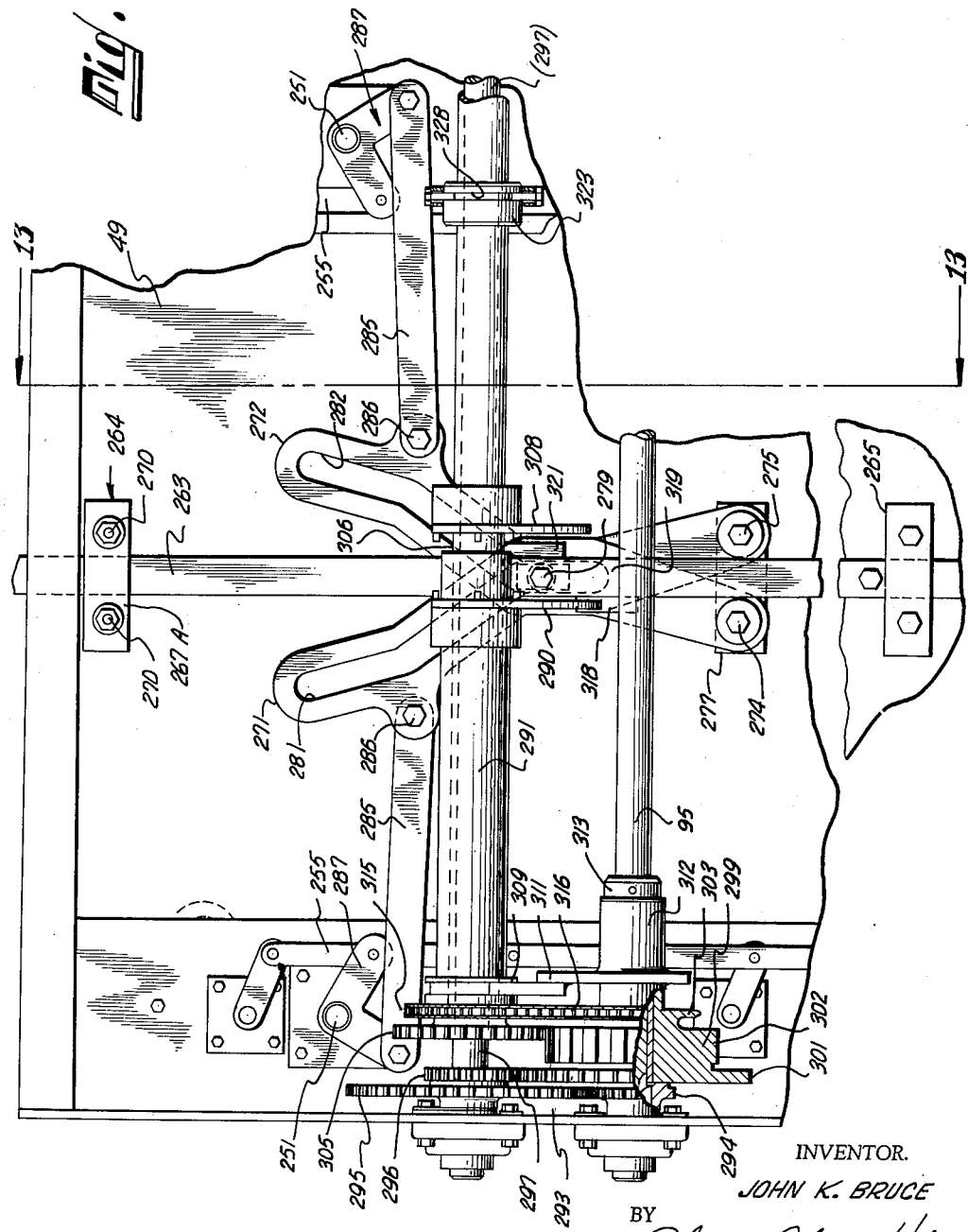

June 19, 1962   J. K. BRUCE   3,039,625
PROCESS AND APPARATUS FOR HANDLING OBJECTS
Filed April 28, 1958   12 Sheets-Sheet 11

INVENTOR.
JOHN K. BRUCE
BY
Christie, Parker & Hale
ATTORNEYS.

June 19, 1962 J. K. BRUCE 3,039,625
PROCESS AND APPARATUS FOR HANDLING OBJECTS
Filed April 28, 1958 12 Sheets-Sheet 12

INVENTOR.
JOHN K. BRUCE
BY
Christie, Parker & Hale
ATTORNEYS.

United States Patent Office 3,039,625
Patented June 19, 1962

3,039,625
PROCESS AND APPARATUS FOR HANDLING OBJECTS
John K. Bruce, La Verne, Calif.
(966 S. Fair Oaks, Pasadena, Calif.)
Filed Apr. 28, 1958, Ser. No. 731,393
12 Claims. (Cl. 214—6)

The invention relates to methods and apparatus for handling obejcts such as containers and more particularly to the stacking and unstacking of such objects.

Eliminating manual handling of products results in more speed and economy in either industrial or agricultural applications. Many devices have been developed for handling and conveying objects of all sorts. However, a great problem still exists when the objects must be stacked one upon the other at some stage during preparation or shipping. Conventionally, objects are stacked for storage or shipment. The height of the stack depends upon the space limitations of the shipping or storing facility. Many handling systems utilize lift trucks of either the fork or gripper type to move the stacked objects about. If multiple stacks are to be handled as a unit, pallet boards are normally used as a base for the multiple stack. The fork lift truck utilizes its fork to lift the pallet and the multiple stacks. In single stack situations a lift truck is conventionally used which grips two opposite sides of the bottom object of the stack.

The lift trucks are an efficient means of moving stacks short distances. Present conventional apparatus is ineffective in preparing the stacks for lifting by the lift trucks or in unstacking vertically aligned objects delivered by the trucks.

I have invented process and apparatus for the efficient stack and unstacking of objects. The process of the invention for handling a plurality of objects may be embodied in the steps comprising the transfer of each of a succession of objects between an object stack and a point spaced therefrom and vertically and successively displacing the objects in the stack. The objects are releasably secured in the stack after each vertical displacement step. The several objects are supported by the lowest object in the stack during vertical displacement.

The process may be implemented by apparatus embodying the concept of my invention which comprises means for transferring each of a succession of objects between an object stack and a point spaced therefrom. Additional means for vertically displacing successively the objects in the stack, and means for releasably securing each object in the stack after each vertical displacement step are provided. The means for vertically displacing the objects is operable to support the objects in the stack by the lowest object in the stack during the vertical displacement of the objects.

When objects are being stacked, it is preferable that both the process and the apparatus be adapted to transfer objects to and from a conveyor. Therefore, the process for stacking objects may comprise the successive steps of transferring a plurality of objects from a conveyor to a vertical trough, lifting a first object within the trough, releasably holding the first object in a raised position and moving a second object beneath the first object. Subsequent steps include lifting the second object and at the same time releasing and raising the first object on top of the second object. Then the first and second objects are releasably held in raised positions and subsequent objects are moved beneath the already raised objects one by one. Each of the successive bottom objects is used to raise all of the previously raised objects as they are released, each of the raised objects being releasably held within the trough in one above the other relationship during the lifting steps to form a stack.

The apparatus implementing the process has means for releasably securing the objects within the vertical trough so that when the desired stack height is achieved the stacked objects may be released and removed from the stacking trough. The invention contemplates apparatus in which the means for lifting an object within the vertical trough is responsive to the presence of an object moved into the trough by arcuately progressing loading means. Preferably, the lifting means is continuously reciprocable and is synchronized with the loading means so that an object is lifted each time the loading means orients an object within the vertical trough.

The means releasably securing the object within the vertical trough preferably comprises paired rollers on opposite sides of the object which are adapted to move upwardly and outwardly from the sides of the object when the object is displaced upwardly. Thus, the releasable securing means does not restrain the upward vertical displacement of the objects under the urging of the bottom object in the stack. Downward motion of each object, however, is opposed by the rollers.

All roller pairs are free to move with respect to each other so that independent suspension of each object in the stack exists. However, a guide means for each roller pair is adapted to be synchronously displaced away from the sides of each object so that all of the rollers are moved to release all of the objects at the same time.

Means for synchronously releasing the roller pairs may be linked to a trip actuated when the uppermost object of the stack reaches a predetermined height or the means may be linked to a manual lever.

The manual lever may have its operation synchronized with the reciprocation of the lifting means. Synchronization may be achieved by a cam fixed to the lifting drive mechanism and which controls the instant at which movement of the manual lever may take place to cause the paired rollers to release the objects.

The described apparatus may be adapted to unstacking by means which trips the roller guides and defeats the suspending action of the rollers on the objects for that period of the downward vertical displacement of the objects equal to the height of an object. Once again the means synchronizing the vertical displacement of the stacked objects may be controlled by a cam fixed to the drive means for the lifting means.

Preferably, the basic components of the stacking and unstacking apparatus are a trough in which the objects are oriented in a stack, a lift mechanism to implement the progression of the objects in the trough, a plurality of paired rollers to suspend the objects, and loading means adapted to transfer successive objects between a loading station and the trough. Additional means such as an intermittently operating conveyor may be provided to remove stacked objects from the trough or to deliver already stacked objects to the trough for unstacking. In either instance a sensing lever dictates the lifting operation of the lift mechanism.

Further advantages of the invention are apparent from the following detailed description and drawings, in which:

FIG. 1A is a fragmentary elevation to a larger scale showing means for locating an object on the conveyor with respect to the stacker;

FIG. 4 is an elevational view, partly broken away, taken from the discharge end of the stacking apparatus;

FIG. 5 is a fragmentary elevational view of the area defined by line 5—5 of FIG. 2;

FIG. 6 is a fragmentary sectional elevation taken along line 6—6 of FIG. 3;

FIG. 7 is a fragmentary sectional elevation taken along line 7—7 of FIG. 6;

FIG. 8 is a fragmentary sectional elevation taken along line 8—8 of FIG. 3;

FIG. 9 is a sectional elevation taken along line 9—9 of FIG. 5 and partly broken away;

FIG. 10 is a fragmentary sectional elevation illustrating the details of the paired rollers which releasably hold the objects in the stacking trough;

FIG. 11 is a fragmentary plan section taken along line 11—11 of FIG. 10;

FIG. 12 is a fragmentary elevation illustrating the roller release apparatus for unstacking the objects in the stacker;

FIG. 14 is a fragmentary sectional elevation taken along line 14—14 of FIG. 4 and showing the synchronism control for the manual release;

FIG. 15 is a fragmentary plan view taken along line 15—15 of FIG. 14; and

Figure 1:
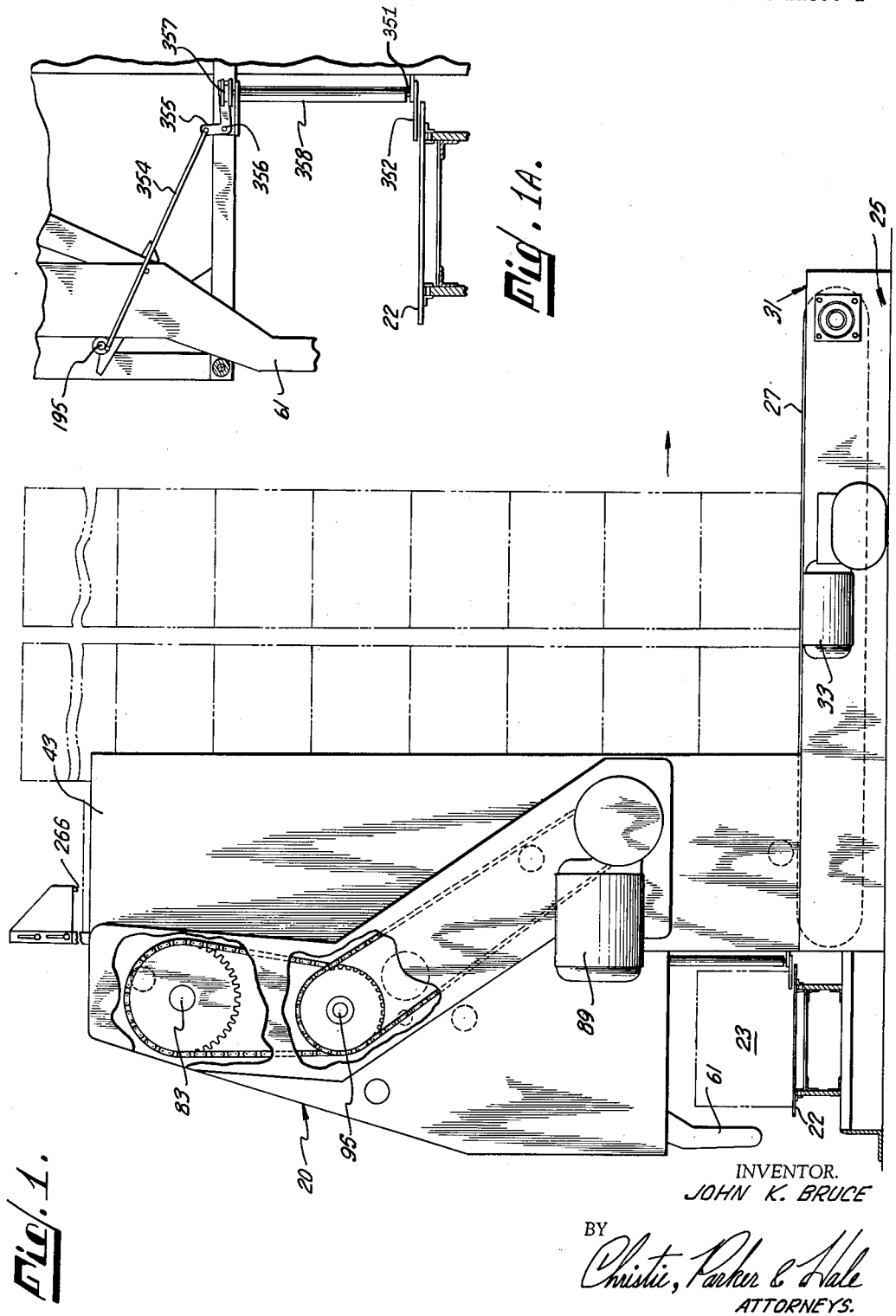
FIG. 1 is an elevational view, partly broken away, of a preferred embodiment of the invention.

FIGS. 1 through 14 illustrate preferred apparatus embodying the invention and adapted to implement the process of the invention. A stacker designated generally by the character 20 is supplied by an endless belt conveyor 22. The conveyor delivers objects such as object 23 shown in phantom lines in FIG. 1 to the inlet side of the stackers.

The stacker comprises a horizontal base 25 in which parallel endless chains 27, 28, 29 operate between loading conveyor 22 and a stacker discharge end 31. Endless chains 27, 28, 29 are commonly driven by a motor and gear reduction unit 33 supported by the base frame and linked to the chains by conventional means not shown.

Figure 3:
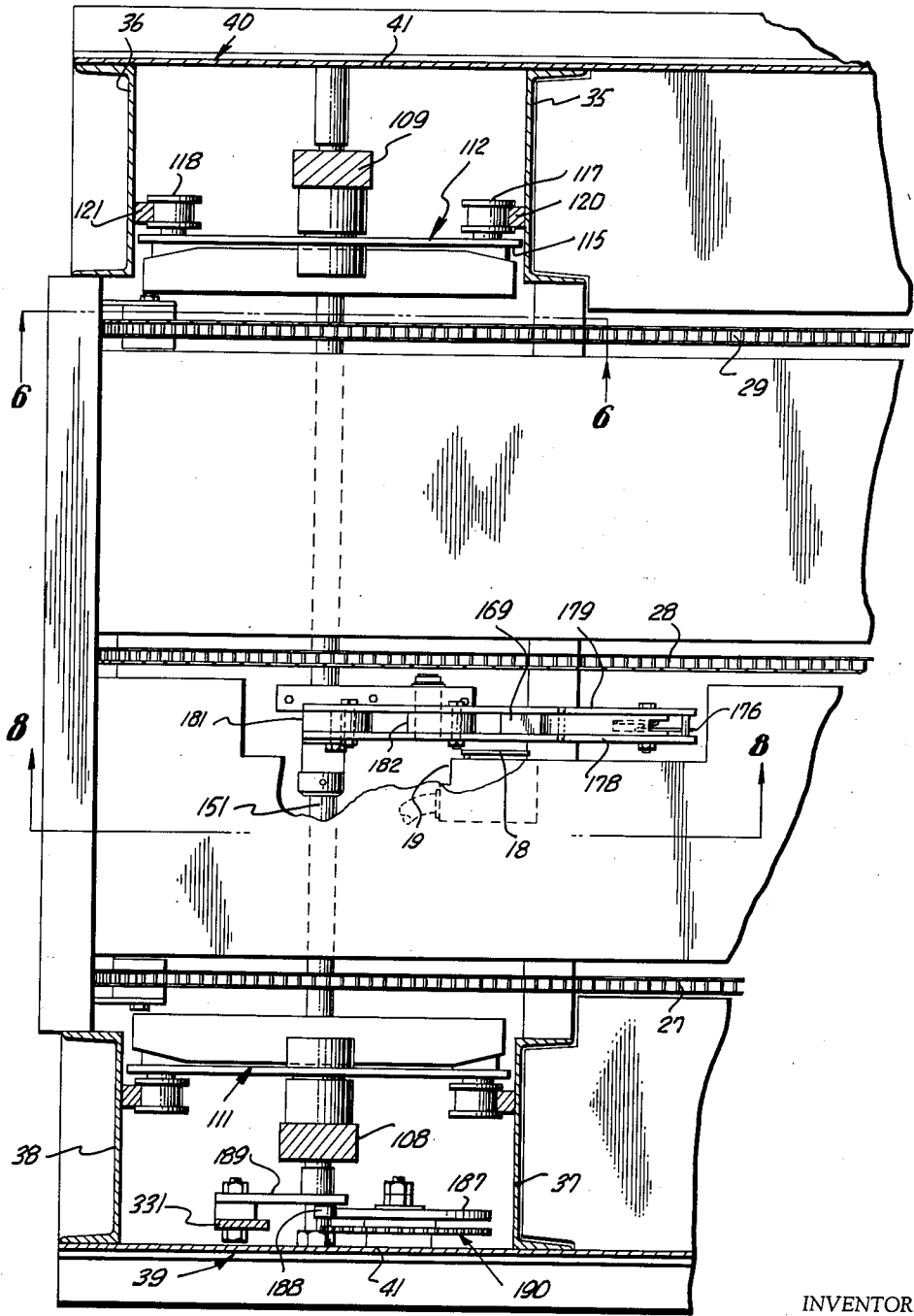
FIG. 3 is a plan section taken along line 3—3 of FIG. 2.

Referring now to FIG. 3, parallel upright channels 35, 36 and 37, 38 combine at either side of the stacker 20 to form side supports 39, 40 respectively. An outer base panel 41 connects each of the side channel pairs and extends from the input end of the base to the output end adjacent discharge conveyor 31. Similar upper panels 43, 44 (see FIG. 1) extend between the channels forming each side column and define a space between the channels of each pair. An inner panel 45 further encloses each column and extends upwardly from near the stacker base to the top of the channels. A U-shaped channel 47 connects the top ends of the respective vertical side panels. Thus, each pair of side channels is a part of a box-like structure whose inner sides combine with a back board 49 to define a vertical trough 51 in which objects are stacked.

The back board supports a pair of vertical parallel rails 53, 54 against which objects such as boxes of produce guide as they are raised within the vertical trough.

Back board 49 has an opening 56 through which a loading bar 58 moves objects from conveyor 22. The loading bar swings in an arcuate path from the outboard edge of the conveyor into the vertical trough through opening 56. The arcuate motion of the loading bar impels a selected container or carton from conveyor 22 onto the endless chains 27, 28, 29.

The loading bar extends horizontally between a pair of substantially L-shaped swing arms 61, 62. The swing arms rotate about pivots 63, 64 remote from the bar and are mounted respectively in panel extensions 65, 66 of side panels 43, 44. An upper horizontal brace 68 extends between panel extensions 65 and 66. The free end of the short arm of each of the L-shaped swing arms supports a counterweight 71.

Motion is imparted to the swing arms by means of a ganged pair of downwardly depending impellers 73, 74. Each impeller is fixed at its upper end to a driven shaft 76 extending from side extension 65 to side extension 66. Shaft 76 is journalled at each of its ends in bearing mounts 77, 78 supported by the side extensions. Shaft 76 is oscillated about its longitudinal axis by means of a drive linkage system 81. The linkage comprises in part a drive shaft 83 and a short throw arm 85 fixed to the end of the drive shaft remote from a driven sprocket 87. A motor 89 rotates the drive shaft by means of a sprocket chain 91 and interchange sprockets 93, 94 commonly fixed to an intermediate shaft 95. Spaced journals 98, 99 held by side wall extensions 65, 66 respectively support the intermediate shaft.

The short throw arm is linked by a beam 101 to an eccentric arm 103 fixed to an outboard end of shaft 76. The effective lengths of arm 85 and 103 differ so that arm 103 oscillates back and forth about the axial center of shaft 76 as throw arm 85 rotates about the axial center of shaft 83. Since impellers 73 and 74 are fixed to shaft 76, they oscillate in arcuate paths toward and away from the vertical trough of the stacker.

The motion of impellers 73 and 74 is communicated to loading bar 58 by linkage means to be described later in relation to FIG. 5.

Shaft 76 also imparts motion to a link arm 105 housed within side support 39 and a link arm 106 housed within side support 40. Each of link arms 105, 106 is in turn pivotally fastened to a substantially vertical lift arm 108, 109 respectively. The motion imparted to the link arms by shaft 76 reciprocates the lift arms in a substantially vertical path within the respective side supports 39 and 40. The lift arms are pivotally connected to carriages 111, 112. The carriages are substantially identical and a description of one will suffice for both.

Each carriage comprises in general a substantially vertical back plate 115 to which roller pairs are mounted near each vertical edge. For instance, as viewed in FIG. 3, upper rollers 117, 118 of each pair are shown rotatably mounted to back plate 115 so that they run on vertical guides 120, 121 fixed respectively to vertical channels 35, 36 of support 40. The rollers fix the reciprocating path of the carriage as it is impelled by lift arm 109.

Figure 2:
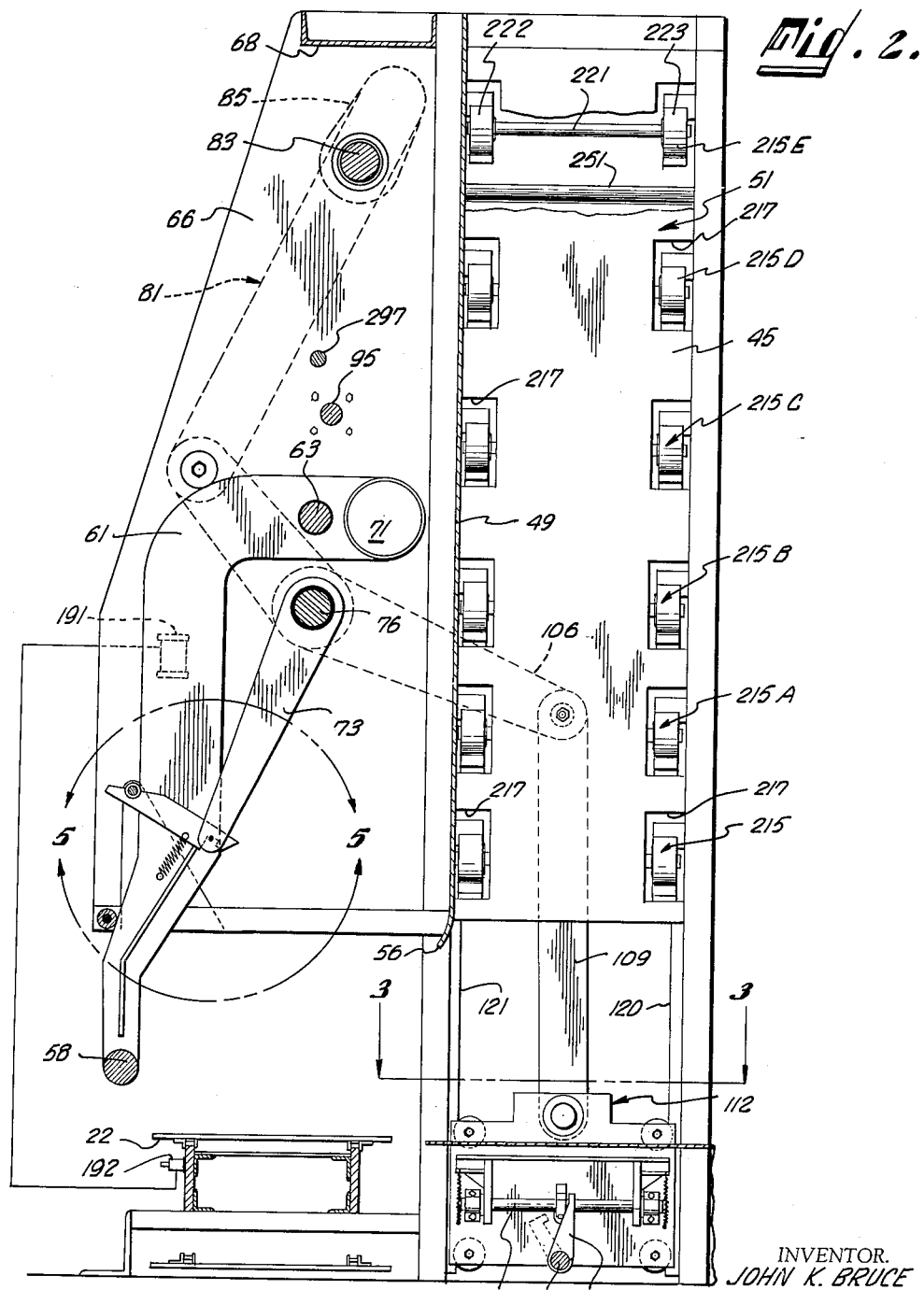
FIG. 2 is a sectional elevation showing the interior of the stacking trough of the stacker.

Referring now to FIGS. 2 and 6, a hinge pin 125 is mounted in a horizontal position near the middle of back plate 115 by journals 127 located one near each vertical edge of the back plate. As reference to FIG. 3 will show, the back plates reciprocate in a path close to outer endless chains 27, 29 which, with chain 28, remove the stacked objects from the trough of the stacker. The hinge pin is mounted on the face of each carriage back plate adjacent an outboard chain. A lifting platform 129 is fixed to the hinge pin substantially along the length of the hinge pin. As viewed in FIG. 7, the lifting platform has the cross-sectional shape of an inverted L with a base 130 of the L remote from the hinge pin and above it. A stem 131 of the L is fixed as by welding to the periphery of the hinge pin. Spaced gussets 132 brace the lifting platform and are themselves fixed to the hinge pin near journals 127.

Since the hinge pin is journalled with respect to the back plate, the lifting platform may be swung toward or away from the back plate. In the position shown in FIG. 4 the lifting platform is against the carrier back plate. In this position the carriage may be reciprocated vertically by the motion of shaft 76 and the lifting platforms do not engage the objects which loading bar 58 impels into alignment with the vertical trough. However, when the lifting platform of each carriage swings into the dotted position 135 shown in FIG. 7, the lifting platforms extend outwardly beyond the side supports 39 and 40 and beneath the object resting on chains 27, 28, 29. Thus, upward reciprocation of the carriages elevates the object in the vertical trough 51 of the stacker.

The alternate positions of the platform are maintained by a pair of toggle springs 137, 138 fastened at their top ends to pins 139, 140 projecting horizontally one from each gusset of the lifting platform. The other end of each spring is fastened by a pin 141 to the back plate. The upper pins are located with respect to the hinge line of the lifting platform so that the springs have a toggle action as movement of the platform swings the springs past the hinge centerline.

The hinging motion of each lifting platform is induced by a camming system. A transverse shaft 151 extends across the stacker from side support to side support. It is journalled conveniently at each of its ends adjacent the outer side plate of each side support. Fixed to the transverse shaft near the inboard face of the back plate of each carriage is a first trip lever 153. The first trip lever extends substantially vertically and at its upper end is a roller 155, located so that it engages a first lever striker 157 fixed to the lifting platform and hinge pin. The lever striker has a shaped surface 158 facing away from the back plate of the carriage. A second lever striker 159 which may be formed integrally with the first is fixed to the lifting platform and hinge pin and extends through a port 160 into the area beyond the back plate of the carriage. A second trip lever 162 fixed to transverse shaft 151 extends radially from that shaft in a position to engage the second lever striker when the proper operating conditions of the stacker exist.

As shown in FIG. 6, first and second trip levers 153 and 162, while fixed to a common shaft, extend from that shaft in parallel planes but at different angles so that the arcuate positions of the roller of first trip lever 153 and an upper cam surface 165 of the second trip lever 162 differ. The roller and the cam surface align with lever strikers 157 and 159 at different rotational positions of shaft 151.

The rotational position of shaft 151 is changed by a sensing parallelogram system 167 having a sensing lever 169 which projects above the surface plate 171 of the stacker base at a point remote from the delivery conveyor 22. Sensing lever 169 comprises an upwardly projecting sensing tab 173 and a horizontally projecting stem element 174 hinged at 175 and loaded by a bent spring 176. Stem 174 resides between spaced horizontal parallelogram elements 178, 179. Vertical sides of the parallelogram are formed by bars 181, 182 extending from pivots 183, 184 in the elements 178, 179 to a fixed parallelogram side 185. Transverse shaft 151 extends through fixed side 185 and the lower end of vertical bar 181 is fixed about the shaft. A pivot pin 186 forms a lower pivot for bar 182. Therefore, as FIG. 8 demonstrates, sensing lever 169 moves laterally away from conveyor 22 under the urging of an object propelled by loading bar 58.

Lateral motion of the sensing lever is limited by a shaped cam 187 in registry with a roller 188 carried by a triangular plate 189 fixed to shaft 151. The sensing lever acts as a stop to locate the object precisely with respect to the trough of the stacker. Tab 173 of the sensing lever may swing downwardly about pivot 175 to permit removal of the stacked objects by means of chains 27, 28, 29.

In addition to limiting the lateral travel of an object being loaded into the stacker, the sensing parallelogram system rotates transverse shaft 151 and thereby moves second trip lever 162 into orientation beneath second lever striker 159. Therefore, each of the continuously reciprocating carriages brings the respective second lever striker 159 into contact with cam surface 165 and the lifting platform of each carriage is thereby swung about hinge pin 125 into lifting position and maintained in lifting position by toggle springs 137, 138.

The shaped cam synchronizes the motion of the parallelogram system with the operation of the lift carriages and the loading bar. Shaft 95 drives the cam by means of a chain and sprocket linkage generally designated by reference character 190. Since shaft 95 is also the intermediate shaft through which power is transmitted to shaft 76 and thus ultimately motivates the loading bar and the lift carriages, the cam operation and the drive system for the loading and lifting operations are commonly driven.

The cam may thus be set so that the parallelogram system is restrained by roller 188 in contact with the cam from shifting the lifting platform attitude to lift position until the lift carriages reach the bottom of their travel. The lift platforms therefore do not actuate to lifting position for an object in the trough until commencement of their upward travel.

When the object in the trough is elevated the sensing lever is no longer loaded, and then rotation of the shaped cam displaces roller 188, rotating shaft 151 and returns the sensing lever to normal position, with an attendant positioning of roller 155 of the first trip lever in position to be contacted by the first lever striker.

With the lifting platforms in the position described above and shown by dotted lines 135 of FIG. 7, the succeeding simultaneous upward travel of carriages 111 and 112 lifts an object within the vertical trough of the stacker.

Objects are impelled against the sensing lever by means of loading bar 58. As described heretofore, the loading bar derives its motion from the oscillating rotation of shaft 76. Since shaft 76 motivates both the loading bar and the vertically reciprocating carriages, there is constant synchronism between the objects being supplied from conveyor 22 and the lifting cycle of the carriages. However, it may be desirable that the operation of the loading bar be selective in contrast to the continuous reciprocation of the lifting carriage when a supply conveyor (such as conveyor 22) carries more than one type of object to be stacked.

For instance, the conveyor could be supplying a battery of stackers each stacking a particular grade of produce. It is possible to impart motion to the loading bar only when the particular object to be stacked in the stacker is in position on the conveyor to enter the stacker. One means of attaining this desired end is illustrated in FIGS. 2, 5 and 9. In those figures the impeller arms 73 and 74 are illustrated as latched to swing arms 61, 62, respectively. The latching mechanism is actuated by means of a solenoid 191 linked in a circuit with a sensing switch 192 fastened to the frame of conveyor 22. In any convenient manner the arrival of the particular desired object on the conveyor at the loading station for the illustrated stacker may close switch 192, energizing solenoid 191. The solenoid is mounted to side panel extension 66 and is linked to a horizontally extending shaft 195 by means of a lever arm 196 pivotally supported from side panel extension 66 by a pivot pin 197. A short link 198 connects the short lever arm of the lever to the solenoid. The longer extension of the lever imparts a degree of rotation to shaft 195 by means of articulated links 199 and 201. Thus, when the solenoid is energized, as depicted in FIG. 5, lever 196 turns about its pivot against the force of a spring 202 and lifts the articulated links 199 and 201 so that shaft 195 rotates a cam portion 204 away from a spring-loaded latch 206 pivotally mounted to each swing arm to release the latch 206 and permit it to move under its spring loading so that a notch 208 of the latch registers about a pin 210 fixed to the impeller.

As FIG. 5 illustrates, shaft 76 rotates under the urging of linkage 81 between it and drive shaft 83 and pulls the swing arms inwardly toward the vertical trough of the stacker and impels an object from the conveyor onto the chain belts 27, 28, 29. As the object is moved laterally along the motionless chain belts, sensing lever 169 is displaced, causing transverse shaft 151 to rotate and to position properly the cam strikers to adjust the lifting platforms into position for elevating the object just loaded.

The cam pattern, as shown in FIG. 14, precludes rotation of transverse shaft 151 for over 180° of cam travel. The peripheral speed of the cam is such that roller 188 keeps shaft 151 from rotating and changing the lever strikers except when impellers 73, 74 are ready to swing inwardly. Shaped cam 187 also controls the time interval during which a partial stack within the trough may be discharged. This procedure is discussed in detail later with respect to FIG. 13.

Once an object has been elevated by lifting carriages 111 and 112, there must be some means for sustaining it in the vertical trough 51 of the stacker. The preferred embodiment of the invention utilizes paired rollers, one pair of which bears against each of two opposite sides of the elevated object to secure it in an elevated position within the stacking trough.

FIGS. 2 and 4 illustrates the "one above the other" arrangement of paired rollers supported within side supports 39 and 40. For instance, in FIG. 2 a plurality of roller sets 215, 215A, 215B, 215C, 215D and 215E protrude into vertical trough 51 of the stacker through a multiplicity of apertures 217 in inner panel 45 of side support 40. Similarly, paired roller sets 219 through 219E protrude through similar apertures in inner panel 45 of side support 39.

Each roller set comprises a roller axle 221 and two pressure rollers 222 and 223. A pressure roller is fixed at each end of the axle so that the space between them is less than the width of the object being stacked. Each aperture 217 has a horizontal extent slightly greater than the thickness of a roller and a vertical extent almost twice the diameter of a roller. The relatively large vertical extent of each aperture permits upward movement of the roller set without interference from inner panel 45.

As illustrated in FIGS. 10 and 11, each roller of each set resides on a holder 224 having a foot 225 and a ramp 226 formed integrally with the foot. Ramp 226 of each holder slants upwardly and away from the vertical trough of the stacker. The upper end of each holder is fastened, as by welding, to a holder sleeve 228 pivotally mounted on a pin 230. The sleeve may have inner bushings 232 mounted near each of its ends to reduce the friction between the pin and the sleeve. Pin 230 is cantilevered from the web of a vertical channel 36 by a screw 234 extending through the web and threaded into the pin. A lock nut 235 secures the screw in the web. A C-ring 236 retains the sleeve on the pin 230.

Each holder is free to swing about the pin upwardly and toward the stacker trough. Such motion is limited by the contact of the roller axle 221 with inner panel 45. Movement of the holder away from the trough and aperture is limited by a stop arm 239 slotted at one end to house a contact roller 231 bearing against the back side of ramp 226. The contact roller is pivotally secured within the slot by a pin 243. The end of the arm remote from the roller is fixed to a shaft 245 which extends from stop arm 239 through the web of panel 36 and a journal 247 bolted to the face of the web opposite the stop arm. A portion of the shaft extends beyond the journal and a lever arm 249 is affixed thereto.

A stop arm is associated with each roller holder. The roller pairs on each side of the vertical trough are ganged by a transverse gang shaft 251 extending between vertical gang strips 255 pivotally secured to each of the lever arms 249 of each stop arm assembly. There are four gang strips 255, one connecting the stop arms cantilevered respectively from each of the vertical channels 35, 36, 37 and 38. The gang shafts actuate the stop arms at a time and in a manner described later with respect to FIGS. 12–14.

In FIG. 10 a fragment of a box or other object being stacked in the apparatus of the invention is shown during a lifting cycle. The container 261 has a side wall 262 which contacts the rollers of a paired roller set. The container has not yet been elevated sufficiently to contact roller 222. Under the impetus of lifting carriages 111 and 112, container 261 will be brought into contact with roller 222 and its mate and the like rollers on the opposite side of the vertical trough. The first contact of the container with the rollers causes each roller set to recede into its respective side support, since the ramp portion of the holder causes the motion of the container to impel the roller set upwardly and away from the vertical trough. The respective receding motion of each of the opposing paired roller sets provides sufficient clearance between the opposed peripheries of the opposed rollers for the container to complete the elevating cycle.

The mass of the roller sets is sufficient to impel each set downwardly along the ramp in opposition to the lifting resultant imposed by the elevation of the container in contact with the rollers. Each container, whether lifted directly by the lifting carriages or elevated by the container directly beneath it, tends to settle downwardly when the lift carriages begin their downward reciprocation. In FIG. 10 a container 261A is shown in phantom lines secured in a vertical position by pressure roller 222 shown in displaced position by phantom lines 222A. Roller 222A cooperates with the other rollers of the respective pressure roller pairs which are not shown. Because of the frictional contact of the container with each roller of the roller sets, the roller sets are impelled downwardly along the ramp surfaces of the holders. The stop arms prevent any swinging of the holders away from the vertical trough. Therefore, any downward motion of the roller sets has an inward component pressing the rollers of each set against the sides of the containers (such as side 262) with sufficient force to secure the container in its elevated position within the vertical trough of the stacker.

As the lifting carriages elevate each of the containers or other objects impelled into the vertical trough from conveyor 22, the roller sets ride upwardly with each successive object in the stack and wedge downwardly as the elevating force of the carriages is removed. The paired roller sets protruding into the vertical trough from the opposed side panels 45 are spaced vertically so that a roller set contacts a single object in the stack. Therefore, when the lifting force of the carriages transmitted from lower to adjacent upper objects ceases, the wedging action of each roller set suspends independently each object in the stack being formed.

The stack may extend beyond the upper limits of the vertical trough. In such an instance roller sets 215E and 219E sustain the weight not only of the object against which they edge but also the weight of all higher objects in the stack.

While the illustrated embodiment of the invention contains six pairs of roller sets, it is obvious that the only limitation on the height of the stack is that imposed by the ability to handle the stack when it is removed from the stacker. The present apparatus utilizing six pairs of roller sets is capable of stacking objects from ten to fourteen high.

The stacked objects are released from the stacker and lowered on carriages 111, 112 until they rest on conveyor chains 27, 28, 29. These chains carry the stacked objects to discharge end 31 of the stacker from where a lift truck or other conveyance transfers them.

Figure 13:
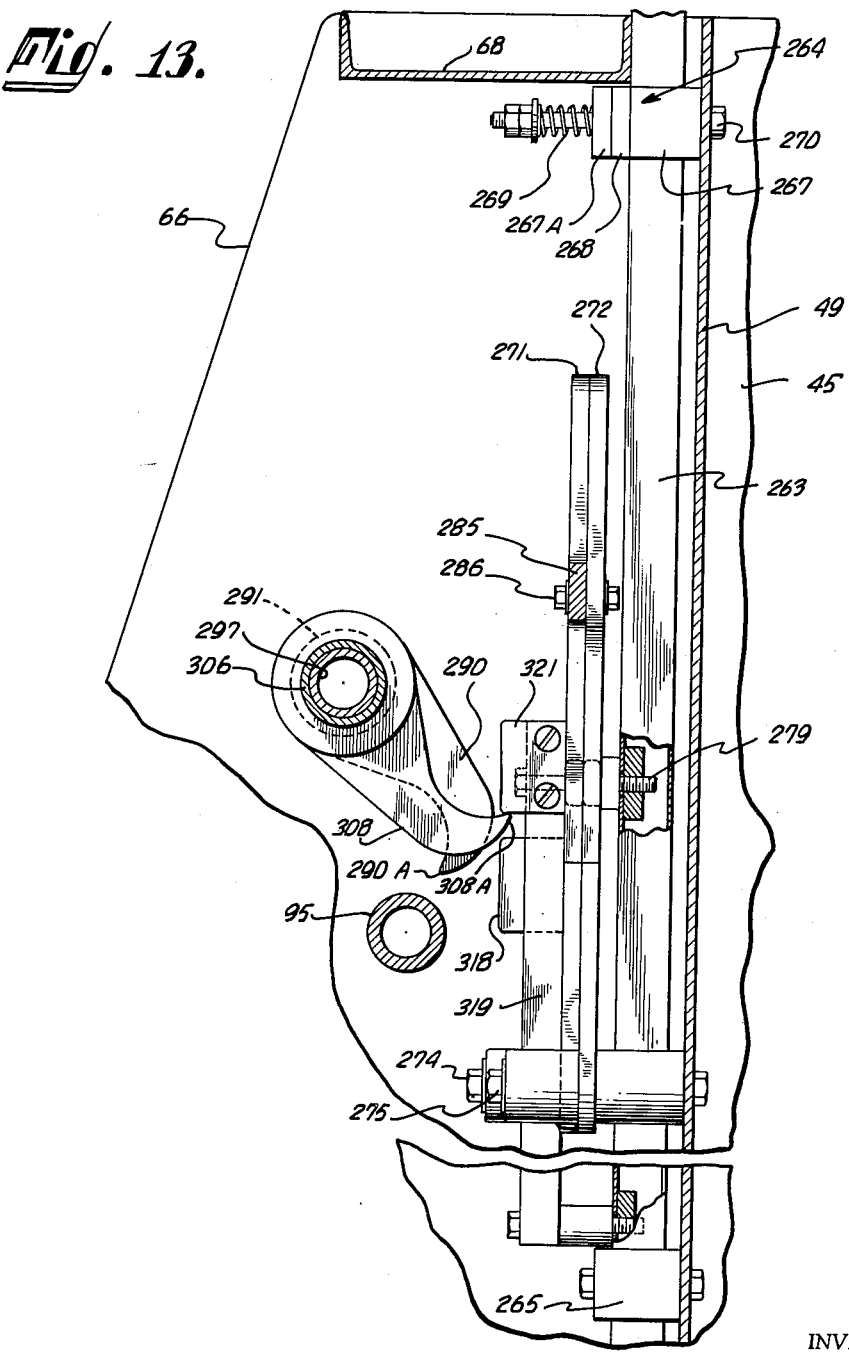
FIG. 13 is a detailed sectional elevation taken along line 13—13 of FIG. 12 and showing the means for implementing manual release of the paired rollers.

Release of the objects in the stacks is accomplished by mechanism best explained with reference to FIGS. 12, 13 and 14. A release rod 263 extends vertically through spaced guides 264, 265 fastened to the face of backboard 49 opposite from the vertical trough. The rod is preferably square in cross-section to hold an actuating finger 266 that is fixed to its top oriented over the vertical trough (see FIG. 1). The upper guide consists of a base block 267, a cap 267A, a friction pad 268 and a pair of compression springs 269. A pair of bolts 270 mount the guide to backboard 49. Each spring is mounted about a bolt and bears against the cap so that the friction pad is forced against a flat surface of the square release rod. The spring loading is sufficient to hold the rod in the position to which the rod is raised by the action of a container against the actuating finger at the top of the rod. The friction pad may be of any suitable friction material. However, brass has proved most desirable because it does not deteriorate under most working conditions.

Each of a pair of actuating levers 271, 272 is pivotally mounted at its lower end to backboard 49 by means of a pivot pin 274, 275 respectively. The pivot pins extend through the respective actuating levers and a spacing block 277 interposed between the levers and the backboard. Each of the actuating levers extends upwardly from its pivot point and crosses the other lever in scissors fashion and is joined thereto by a central pivot pin 279. The upper portion of each actuating lever is shaped so that a cam track 281 and 282 respectively, is defined centrally of the upper portion of each lever. The path of the cam track in each lever is generally vertical for a short distance and then outwardly and upwardly away from the pivot pin and then upwardly for an approximately equal distance at a lesser outward angle.

The central pivot pin is cantilevered horizontally from rod 263. The pin carries rollers 283 of a diameter approximately equal to the width of the cam track in each actuating lever. One roller is positioned on the pin to reside in the cam track of each of the overlapping actuating levers. Upward motion of rod 263, which is in a fixed vertical path because of mounting guides 264, 265, causes the upper ends of levers 271, 272 to draw together as the rollers on pin 279 ride against the cam tracks in each of the levers.

When finger 266 is contacted and forced upwardly by the uppermost object of a stack, the release rod is lifted in its vertical path and each actuating lever moves toward a central line. Motion of the actuating levers is used to release the stop arms from their limiting position against the holders of the roller sets. The roller sets are then free to drop away from the vertical trough and each object in the stack is thereby released to be lowered in the vertical trough as the downwardly reciprocating carriages return to the level of the outwardly movable continuous chains 27, 28, 29.

The motion of the actuating levers is transmitted to the stop arms by horizontal link strips 285 extending from a pivotal connection 286 on the outboard side of each actuating lever to an L-shaped connector 287. Each connector is fixed at the juncture of its arms to transverse gang shaft 251. One arm of the connector is pivotally fastened to the outboard end of the link strip and the other arm of the connector is similarly fastened to one of the vertical gang strips which connect all of the stop arms in the manner heretofore described.

After the release rod is raised by pressure of a lifted object against the actuating finger at the top of the rod, the friction pad of the upper guide maintains the release rod in its raised position. Because of the described linkage between the release rod and the stop arms, the pressure rollers remain away from the sides of the objects being stacked long enough for the continuous chains to remove the now stacked objects from the confines of the stacking trough. The release rod is returned to its normal position by a first shaped finger 290 which is rotated by a shaft 291 mounted away from backboard 49.

Finger 290 is one of a pair of fingers which rotate continuously in opposite directions. Motion is transmitted to the fingers by means of a gearing system 293 motivated by shaft 95. Shaft 95 has a small gear 294 which is fixed to the shaft adjacent the end journal of the shaft. The small gear drives a larger driven gear 295 which is part of a cluster comprising driven gear 295 and a smaller drive gear 296 rotatably mounted on a long transverse support shaft 297. Drive gear 296 drives a gear cluster 299 consisting of a large gear 301 meshed with drive gear 296, an intermediate gear 302, and a sprocket gear 303. Gear cluster 299 is free to rotate on shaft 95.

Intermediate gear 302 is a comparatively wide gear meshed with a narrow gear 305. Narrow gear 305 is fixed to a tubular drive shaft 306 to which a second shaped finger 308 is fixed. Both support shaft 297 and drive shaft 306 pass through shaft 291 to which first shaped finger 290 is fixed. The transverse position of shaft 291 is maintained by a grooved collar 309 in which a support fork 311 rides. The support fork extends upwardly from a tubular bearing housing 312 journalled on shaft 95 and positioned between a thrust collar 313 fixed to shaft 95 and the gear cluster 299.

Drive shaft 306 and second shaped finger 308 are driven by a sprocket gear 315 fixed to an end of the drive shaft and linked to sprocket gear 303 of the lower cluster by a sprocket chain 316.

The intermediate gear 302 and the sprocket gear 303 are commonly rotated by drive gear 296. However, the gears which they drive are counter-rotated because driven narrow gear 305 is directly meshed with intermediate gear 302 while driven gear 315 is linked to sprocket gear 303 by a chain. Therefore, the first and second fingers 290 and 308 respectively, rotate in opposite directions, being fixed to the separate shafts turned by the driven gears. The gear ratios are such that the fingers themselves rotate once for each three cycles of the lift platform. First shaped finger 290 impels the release rod downwardly into its normal position, and its cycling time with respect to the lifting platform provides an ample period for the already stacked objects to remove from the vertical trough before the pressure rollers return to their object suspending position.

The curving tip 290A of the first finger contacts a first tab 318 carried by a support bar 319 at one point of finger rotation. In FIG. 13 release rod 263 is in its normal position. It has not yet been raised by a container reaching the predetermined maximum height of the stack. A second tab 321 fixed to the opposite side of the support bar from the first tab 318 is positioned to be contacted by second shaped finger 308. Fingers 290 and 308 are similarly shaped but mounted to their respective drive shafts in opposite orientation. The second finger (as shown in FIG. 12) is transversely spaced from the plane of tab 321. The second finger must be shifted to the left, as viewed in that figure in order to contact the tab 321. In FIG. 13 the curved tip 308A of the second finger is rotated to the point at which it contacts and lifts the second tab and thereby lifts the release rod. While not essential to the operation of the stacker, the second shaped finger is provided to permit manual actuation of the release rod so that a partial stack may be discharged from the vertical trough of the stacker if desired.

The second finger is manually shifted by means of a thrust collar 323 fixed to drive shaft 306 at a point spaced from the second finger. A manual control lever 325 protrudes outwardly from a yoke 326 (see FIGS. 14 and 15) having thrust pins 327 in registry with a groove 328 of the thrust collar. When the control lever is pushed in the direction of the second shaped finger, drive shaft 306 slides along support shaft 297 moving second finger 308 into the plane of second tab 321. The movement does not disengage narrow gear 305 because it merely changes its position along the wide face of intermediate gear 302.

Once the second finger has been shifted, its continuing rotation lifts the tab and the release rod permitting the pressure rollers to move away from the stacked objects.

There is a period during the operation of the stacker during which manual release of the partial stack would result in damage to the objects or to the machine. If the release were actuated, removing the suspending function of the pressure rollers while the lift carriage was not in position to assume the weight of the stack, both the stack and the mechanism might be harmed. Therefore, linkage is provided between the manual control lever and the shaped cam 187 previously described to disarm the manual control lever unless the lift carriages are at a proper position. A vertical link 331 is pivotally connected to a corner of triangular plate 189. The vertical link extends upwardly to a second triangular plate 332 and is pivotally fixed to a lower corner of the plate. The second plate is pivotally mounted at 333 by a pivot pin 334 supported in the outer wall of side support 39. The upper corner of the second triangular plate has an elongated slot 335. A bolt 336 rides in the slot and connects an adjustable sleeve 337 to the plate. The opposite end of the sleeve is fixed by means of a bolt 338 riding in a slot 339 of a lever arm 340. The lever arm forms a part of the yoke 326. The arm extends at right angles to the yoke. The juncture of the yoke and the lever arm is pivotally mounted in a clevis 341 cantilevered from panel extension 65 of the stacker.

Vertical link 331 therefore is capable of raising first triangular plate 189 when lever arm 340 swings about its pivot. The same motion of the manual release lever which moves the lever arm also shifts the thrust collar 323 and the second shaped finger. However, it can be seen that no motion of the link 331 is possible while roller 188 (FIG. 14) rides the high part of shaped cam 187. Therefore the described linkage prevents motion of the manual release lever during the more than 180° of cam travel in which roller 188 bears against the high part of the cam. Since the triangular plate 189 serves a second function in changing the position of transverse shaft 151, a slot 343 is provided in the vertical link to permit inward motion of the plate with respect to the cam without disturbing the position of link 331.

After the release rod has been raised by the second shaped finger and a partial stack removed, the first shaped finger continues to rotate and brings the first finger into contact with tab 318 and impels the release rod downwardly into its normal position. In this position the pressure rollers are locked in their suspending attitude.

In normal operation of the preferred embodiment of the invention objects brought to the stacker by conveyor 22 or by other suitable means are impelled into the vertical trough of the stacker by the loading bar.

When solenoid 191 is actuated by switch 192, the solenoid latches the impellers to the swing arms of the loading bar and also sets a lock pin 351. The pin holds a stop dog 352 in the path of the object on the conveyor. The dog detains the object until the loading bar impels it into the trough (see FIG. 1A).

The stop dog is pivotally mounted to the stacker frame so that it normally swings out of the path of an object carried on conveyor 22. However, when the solenoid is actuated and shaft 195 rotates, a connecting rod 354 mounted eccentrically with respect to the shaft, turns an L-shaped lever arm 355 about a pin 356, depressing a spool 357 which lowers lock pin 351 through a tubular housing 358 and locks the stop dog.

The entry of the object into the vertical trough moves the sensor tab and the sensor parallelogram causing transverse shaft 151 to rotate. Shaft 151 rotates despite the pressure of roller 188 against the surface of cam 187 because the cam is positioned with its reduced diameter in registry with the roller due to the fact that the loading arm and the lift carriages are commonly driven and the motion of each is synchronized with the cam position. The loading bar does not impel an object into the trough until the cam and therefore the lift carriages, are properly positioned.

When the transverse shaft rotates it carries each second trip lever into alignment with the second lever striker of each lift carriage. At the bottom of its descent each lift carriage impels the second lever striker against the trip lever and the lift platform of each carriage is moved into its lifting position. This change in platform position occurs below the bottom level of the object presently in the trough so that no interference with the platform is caused by the presence of the object. On their upward cycle the lift carriages bring the lift platforms beneath the object and raise it in the trough upwardly through the pressure rollers. The rollers move backwardly and upwardly along the holder ramps during passage of the object. The carriages start their downward descent and the weight of the object in contact with the rollers impels them downwardly along the ramp with an inward resultant suspending the object in the trough.

Each succeeding object lifted in the trough lifts the previous object into contact with the next upward roller set. Successive objects are lifted and releasably suspended within the stacker until the first object stacked contacts actuating finger 266 of the release rod during its last upward motion. As this last motion raises the release rod, the actuating levers 271 and 272 move inwardly causing rotation of gang shafts 251. The gang shafts in turn move the gang strips 255 moving the roller stop arms away from the pressure roller holders.

The removal of the stop arms permits the weight of the suspended stacked objects to push the pressure rollers inwardly, thus releasing their friction grip on the sides of the objects. Therefore, the weight of the entire stack is shifted to the lift carriages at the uppermost travel of the carriages. The release of the pressure rollers takes place at this moment and the entire stack is lowered by the carriages onto the continuous conveyor chains 27, 28, 29. When the objects are lowered onto the conveyor chains the bottom object contacts a switch lever 18 and closes the contacts of a control switch 19 which supplies the drive motor for the conveyor chains. The chains operate until the stack is moved outwardly from the stacker trough and no longer depresses switch lever 18. The position of the switch lever with respect to the width of the stacker trough may be altered to change the space interval between successive object stacks moving from the stacker.

The sensor tab is within the boundaries of the stacking trough. The descent of the stacked objects depresses the tab and it swings downwardly about pivot point 175 and therefore does not interfere with the outward progress of the stack.

When the spring 176 returns the sensor tab to its normal position and cam 187 rotates so that transverse shaft 151 re-positions the first trip lever and withdraws the lifting platforms from lifting position, the stacker is in condition to receive the initial object of another stack.

Figure 16:
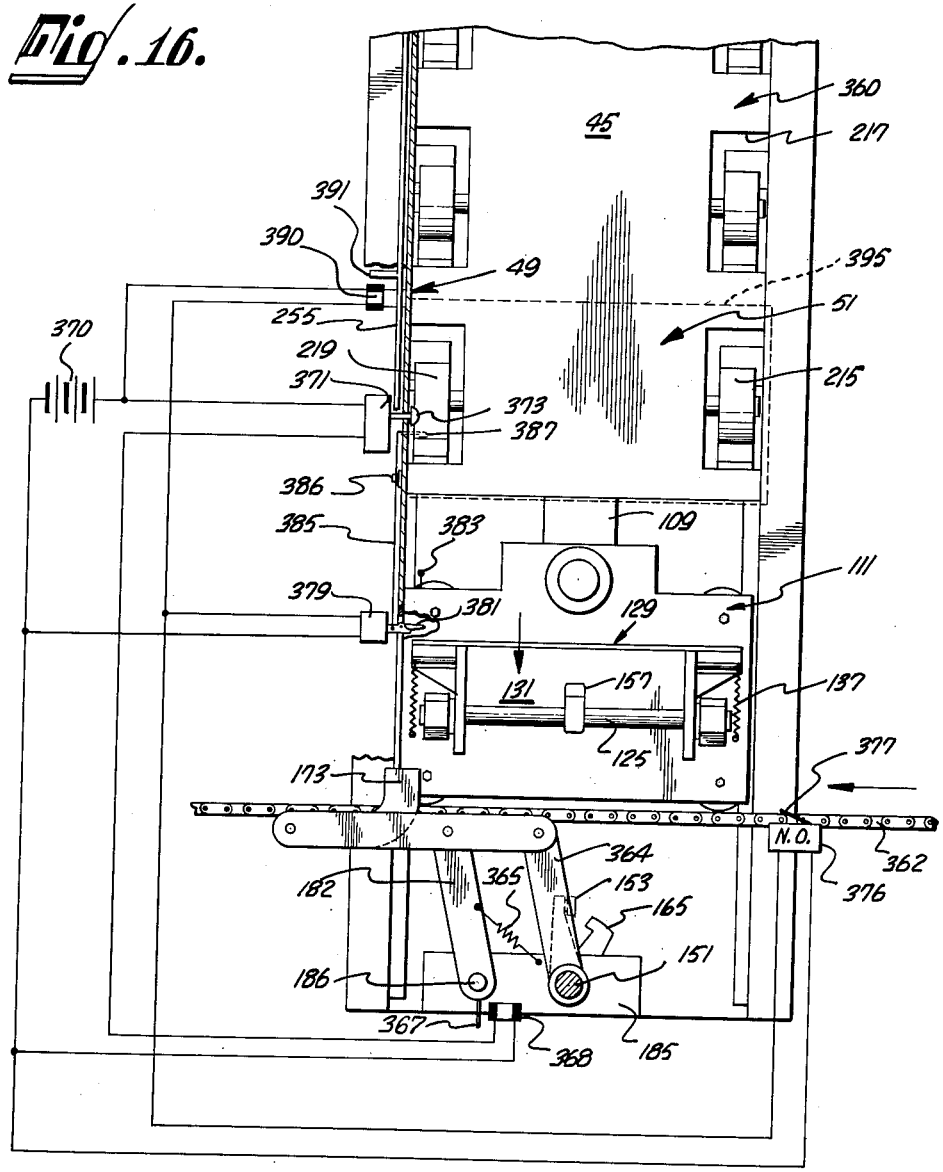
FIG. 16 is a schematic illustration of an alternate embodiment of the invention adapted for unstacking objects.

FIG. 16 illustrates apparatus for implementing the unstacking process of the invention. The process comprises moving a stack of objects into a vertical trough and lifting the stack within the trough while releasably suspending the objects of the stack within the trough with the exception of the bottommost object. The bottommost object is lowered from contact with the suspended stack and removed from within the trough. The remaining stack is supported independently of the releasable suspending means by each succeeding lowest object during the lowering of the stack within the trough by the increment of one object. Each succeeding next lowest object is removed from vertical orientation with the stack while the remaining objects are releasably suspended within the trough.

The illustrated apparatus implements the foregoing process. Those parts of the apparatus of FIG. 16 which are identical to parts of the stacker 20 heretofore described are given like reference characters. The unstacker which is designated generally by the character 360 is diagrammatically illustrated. Vertical trough 51 has apertures 217 in side panel 45 through which pressure rollers such as rollers 215 and 219 protrude into the trough. A pair of lift carriages such as carriage 111 reciprocate adjacent the trough. Carriage 111 is illustrated as progressing downwardly toward a feed conveyor 362 which is shown fragmentarily.

Lift carriage 111 has a lift platform 129 similar in all respects to the lift platforms described with respect to stacker 20. The carriage is reciprocated by a lift arm 109 actuated as in the stacker. A sensing parallelogram 364 is similar to the sensor parallelogram shown in FIG. 8 but is oppositely oriented with respect to backboard 49 of the vertical trough. Sensing tab 173 shifts the parallelogram when a stack of containers or other objects are impelled into the vertical trough by conveyor 362. The parallelogram is fixed to a transverse shaft 151 to which first and second trip levers 153 and 165 are also fixed. A return spring 365 connected between arm 182 and base 185 exerts a return force on the sensor parallelogram.

An armature 367 depends from parallelogram arm 182 below pivot point 186 of that arm. A first solenoid 368 is fixed to the unstacker base adjacent the armature. The first solenoid is linked electrically in series with a source of current 370 and a normally open push button switch 371. The current source may be located conveniently within the base of the unstacker. The push button switch is mounted adjacent the backboard of the trough so that a contact button 373 protrudes into the space in the trough to be occupied by a stack. A normally open micro switch 376 supported adjacent the entrance to the vertical trough is located vertically so that a contact lever 377 of the micro switch is depressed when the conveyor impels a stack into the trough. The micro switch is also linked to current source 370. A toggle switch 379 has a lever 381 hinged so that an upward force does not throw the switch while a downward force does. The lift carriage has a trip tab 383 fastened to one of its upper surfaces in line with switch lever 381.

A link rod 385 fastened to the lever of the toggle switch extends upwardly through a sleeve guide 386 to a horizontal upper lever arm 387 which projects into the space behind side 45 of the vertical trough. Toggle switch 379 is mounted so that its hinged lever also projects into this space. Trip tab 383 mounted to the carriage extends horizontally so that it may contact both levers 381 and 387.

A second solenoid 390 is mounted to the unstacker adjacent a projecting armature 391 fixed to a gang strip 255 which is similar in all other respects to the gang strips of stacker 20. The second solenoid is electrically connected to the current source and to switch 376 and is additionally connected to toggle switch 379. The electrical linkage is such that either toggle switch 379 or switch 376 may actuate solenoid 390.

A stack of objects to be unstacked is impelled into the vertical trough of the unstacker 360 by chain conveyor 362. This conveyor is continuously operating. Just prior to the entry of the stack into the trough the lowest object in the stack depresses lever 377 of switch 376 actuating second solenoid 390. The solenoid moves armature 391 of gang strip 255 and the motion of the gang strip, as described with respect to the stacker, permits the pressure rollers to recede from the trough. Therefore, the trough is clear along its entire height for the entry of the stack.

During the entry of the stack the carriages such as carriage 111 are reciprocating in their vertical paths. Spring 365 tends to hold the sensor mechanism in a position such that transverse shaft 151 orients first trip lever 153 in a position to maintain the lifting platform such as platform 129 back against the carriage. As described with respect to the stacker, the position of shaft 151 is maintained by the cam 187 (not shown). However, when the stack contacts sensing tab 173 and the cam rotates to a position permitting shifting of the transverse shaft, second trip lever 165 rotates into proper position for moving the platforms into the lift position.

When the objects have progressed entirely into the trough, lever 377 of switch 376 is no longer depressed and deactivated solenoid 390 no longer holds the gang strips away from their normal positions. Therefore, the pressure rollers contact the objects in the trough. The bottom object shifts the sensing tab and an upper object contacts button 373 of the push button switch energizing first solenoid 368. This solenoid resets the sensor mechanism and shaft 151 to lift position as long as objects such as container 395 (shown in dotted lines) remain in the vertical trough.

With the lifting platforms in lift position the next upward cycle of the lift carriages raises the entire stack within the trough. The upward movement of the carriage moves trip tab 383 past toggle switch 379 without disturbing its setting. However, when the carriage reaches upper switch lever 387, the toggle switch is closed, actuating second solenoid 390 and releasing the grip of the rollers on the stack. Thus, while the carriage lifts the entire stack, including the lowest object in the stack into position to be suspended by the pressure rollers, the toggle switch arrangement defeats the pressure rollers so that the entire stack is lowered by the lift carriage during the upper portion of the downward travel of the carriages. However, the spacing between the upper and lower levers associated with toggle switch 379 is such that tab 383 on the carriage strikes hinged lever 381 of the switch during the downward travel of the carriages at the instant the stack has been lowered an increment equal to the height of one object. Therefore, the stack is lowered the increment of one object, toggle switch 379 is turned off deactivating solenoid 390 and the gang strips return to normal position and the pressure rollers are impelled into position suspending the objects in the stack. Since the lowest object in the stack is below the level of the lowest rollers, the lift carriages can lower it to conveyor 362. Sensing tab 173 does not impede the removal of the lowest object since the descent of the object upon the tab pivots it out of the way.

The now empty carriages are once again lifted to the height of the next lowest object in the original stack and trip tab 383 hits upper lever 387 and actuates second solenoid 390 and the removal cycle of the now lowest object in the stack is repeated.

While an electrical system for controlling the locking and unlocking of the pressure rollers has been illustrated and described, the same object can be achieved by mechanical or other means. The illustrated embodiments of the apparatus for stacking and unstacking objects are the presently preferred forms. However, different embodiments can be envisioned within the scope of the invention.

The process implemented by the illustrated apparatus is easily adapted to objects of many types and provides marked improvement in the art of handling objects.

I claim:

1. A process for unstacking a plurality of objects from a stock comprising the steps of moving the stack into a vertical trough, lifting the stack within the trough, releasably suspending independently each object of the stack within the trough with the exception of the bottommost object, lowering the bottommost object from contact with the suspended stack, removing the bottommost object from vertical alignment with the stack, supporting the stack independently of the suspending means by means of each succeeding next lowest object, lowering the stack within the trough by the increment of one object by lowering each succeeding next lowest object below the suspending means, and removing each succeeding next lowest object from vertical orientation with the stack while the remaining objects are releasably suspended.

2. A process for stacking objects comprising the steps of lifting a first object within a vertical trough, releasably holding the first object in a lifted position, moving a second object beneath the first object, lifting the second object within the trough and at the same time raising the first object on top of the second object, releasably holding the first and second objects within the trough in lifted positions, moving subsequent objects one by one beneath the already elevated objects, lifting all elevated objects by the lifting of the subsequent bottom object, releasably holding each elevated object independently of each other object until the desired stack height has been reached, and lowering the stacked objects and removing them from the trough.

3. Apparatus for stacking objects in one atop the other relationship comprising a stacking trough, a loading bar adapted to impel objects into the stacking trough, a lift carriage at each of two opposite sides of the stacking trough and reciprocable continuously along the trough, a lift platform hinged to each carriage and adapted selectively to engage and lift an object in the trough, a first and a second trip lever in the path of each carriage, a first and a second lever striker on each carriage each adapted to change the position of the respective lift platform, a sensor mechanism projecting into the trough and responsive to the input of an object into the trough and linked to move each of the trip levers, a rotating control synchronized with the action of the loading bar limiting the period during which the sensor mechanism moves the trip levers, a plurality of roller sets on each of two opposite sides of the trough adapted to suspend releasably objects in the trough, means for reciprocating the lift carriages, means for actuating the loading bar, means for moving the roller sets to release the objects suspended thereby, and means synchronizing the reciprocation of the lift carriages and the actuation of the loading bar and the rotation of the rotating control.

4. Apparatus in accordance with claim 3 in which the means for actuating the loading bar comprises an oscillating shaft, spaced impeller arms fixed to the oscillating shaft, spaced swing arms pivotable with respect to the vertical trough and supporting the loading bar between them, selectively operable latching means adapted to link the impeller arms and the swing arms, and means remote from the latch for actuating the latch to link the impeller arms and the swing arms and impel a desired object into the trough.

5. Apparatus in accordance with claim 3, in which the means for reciprocating the lift carriages comprises an oscillating shaft, a lift arm pivotally connected to each lift carriage and extending upwardly therefrom, and a pair of spaced link arms one pivotally attached to each lift arm at one of its ends and fixed at the other of its ends to the oscillating shaft so as to extend substantially horizontally therefrom.

6. Apparatus in accordance with claim 3 in which the means synchronizing the reciprocation of the lift carriages and the actuation of the loading bar and the rotation of the cam comprises a power source, an intermediate distributing shaft driven by the power source, a continuously rotating shaft driven by the intermediate shaft, an oscillating shaft, eccentric drive means linking the continuously rotating shaft and the oscillating shaft, means linking the lift carriages to the oscillating shaft, means linking the loading bar to the oscillating shaft, and means between the intermediate shaft and the cam to impart rotating motion to the cam.

7. Apparatus in accordance with claim 3 in which the means for moving the roller sets comprises a roller holder having a ramp portion supporting each roller of a set, a horizontal shaft pivotally mounting each holder to enable the holder to swing toward and away from the vertical trough, a stop arm pivotally mounted to bear against each holder and inhibit motion of the holder away from the vertical trough, means for turning the stop arm toward and away from the vertical trough, means ganging the respective stop arm turning means of each roller set so that the stop arms move simultaneously, and means for actuating the stop arm turning means responsive to the lifting of the first object in a stack within the vertical trough.

8. Apparatus in accordance with claim 7 in which the means for actuating the stop arm turning means comprises a release rod slidable vertically with respect to the trough of the stacker, an actuating finger fixed to the release rod so as to extend over the trough into the path of raised objects, a first actuating lever having a roller track, a second actuating lever having a roller track and overlying the first lever at an angle thereto, a pair of coaxial rollers supported on the release rod so as to reside one in each track, a horizontal link strip extending from each actuating lever connecting to the means ganging the respective stop arm turning means of each roller set, each of the first and second actuating levers being pivotally mounted at an end so that upward travel of the coaxial rollers under the urging of the release rod when raised by the contact of an object with the actuating finger fixed to the rod causes convergence of the unpivoted ends of the levers and a translation of the convergence by means of the link strips and the ganging means into a turning of the stop arms away from the trough releasing the objects therein, a distributing shaft, a shaped finger, a tab on the release rod, means deriving motion from the distributing shaft adapted to rotate the finger so that the finger contacts the tab and impels the release rod downwardly and thus diverges the actuating levers and causes the stop arms to be impelled toward the trough to restrain the roller sets in position to suspend objects in the vertical trough.

9. Apparatus for stacking objects comprising a stacking trough, lift means for raising a first object within the trough, holding means for releasably securing the first object in a raised position within the trough and releasing same responsive to additional movement of the object further into the trough, means for moving a second object beneath the first object in proper orientation to be lifted within the trough in turn by the lift means and at the same time engage and lift the released first object on top of the second object, holding means for releasably securing the first and second objects in raised positions and releasing same responsive to additional movement of the first and second objects further into the trough, means for moving successive objects beneath the previously raised objects one by one, the said lift means lifting all the released raised objects by lifting of the successive bottom object, and a plurality of additional holding means for releasably securing the raised objects in one above the other relationship within the trough between lifting steps to form a stack and releasing same responsive to additional movement of the objects further into the trough, said additional holding means being spaced along the stack of objects within the trough to releasably secure the objects in raised position independently of each other, means for simultaneously releasing each of said holding means, and means for moving the entire stack out of the trough in a horizontal direction.

10. Apparatus for stacking objects in one atop the other relationship comprising a stacking trough, loading means adapted to move objects into the trough, a carriage at each of two opposite sides of the trough and reciprocable along the trough, means for moving the carriages in phase with the loading means, a lifting platform hinged to each carriage and adapted to move to a lift and to a non-lift position for objects in the trough, a first trip lever and a second trip lever movably mounted in the path of each carriage and adapted to selectively have only one thereof in actuating position, a first trip lever striker on each platform adapted to engage the first trip lever in actuating position and move the platform to lift position, a second trip lever striker on each platform adapted to engage the second trip lever in actuating position and move the platform to non-lift position, and means actuated by the input of an object into the trough in proper position for lifting for positioning the first trip lever in actuating position.

11. Apparatus in accordance with claim 10 in which a plurality of paired rollers are suspended within the trough so as to be movable against the objects lifted in the trough, a pair of rollers being movable against each of two opposite sides of the object.

12. Apparatus for handling a plurality of objects for transferring each of a succession of objects between an object stack and a remote point spaced therefrom, comprising means for successively displacing the lowermost object vertically in the stack, means for releasably gripping each of the objects in the stack independently of each other after each vertical displacement of the stack, means for actuating the gripping means to release the stack in response to vertical movement of the lowermost object, whereby the objects are supported by the lowermost object during vertical displacement, and means for simultaneously moving the entire stack laterally into and out of position of engagement with said gripping means.

References Cited in the file of this patent

UNITED STATES PATENTS

| | | |
|---|---|---|
| 1,262,335 | Hansalpakar | Apr. 9, 1918 |
| 1,632,203 | Threefoot et al. | June 14, 1927 |
| 2,591,259 | Hess | Apr. 1, 1952 |
| 2,609,111 | Daves et al. | Sept. 2, 1952 |
| 2,629,503 | Neja | Feb. 24, 1953 |
| 2,687,813 | Verrinder et al. | Aug. 31, 1954 |

FOREIGN PATENTS

| | | |
|---|---|---|
| 145,494 | Sweden | May 25, 1954 |
| 368,709 | Great Britain | Mar. 3, 1932 |
| 805,022 | Germany | May 4, 1951 |